United States Patent [19]

Fiorentini

[11] 4,332,335
[45] Jun. 1, 1982

[54] HEAD FOR MIXING AND EJECTING INTERACTING LIQUID COMPONENTS, FOR MOLDING PLASTIC MATERIALS

[75] Inventor: Carlo Fiorentini, Saronno, Italy

[73] Assignee: Afros S.r.l., Varese, Italy

[21] Appl. No.: 187,826

[22] Filed: Sep. 16, 1980

Related U.S. Application Data

[63] Continuation of Ser. No. 961,853, Nov. 17, 1978, abandoned.

[30] Foreign Application Priority Data

Mar. 9, 1978 [IT] Italy ............................... 21022 A/78

[51] Int. Cl.[3] .............................................. B67D 5/60
[52] U.S. Cl. .................................. 222/145; 137/242; 222/149; 222/318; 425/217
[58] Field of Search ............... 222/130, 136, 145, 149, 222/318, 600; 137/242; 425/130, 217; 239/118, 124

[56] References Cited

U.S. PATENT DOCUMENTS

| | | |
|---|---|---|
| 3,666,147 | 5/1972 | Shiraki et al. ........................ 222/309 |
| 3,706,515 | 12/1972 | Keuerleber et al. . |
| 3,952,991 | 9/1976 | Schneider . |
| 3,975,128 | 8/1976 | Schlüter ........................... 222/145 X |
| 3,981,662 | 9/1976 | Bielfeldt et al. . |
| 4,073,408 | 2/1978 | Hartwig ............................... 222/145 |
| 4,141,470 | 2/1979 | Schulte et al. .................. 425/130 X |
| 4,155,508 | 5/1979 | Fiorentini ........................... 239/124 |

FOREIGN PATENT DOCUMENTS 2007935 10/1975 Fed. Rep. of Germany .
2907938 10/1979 Fed. Rep. of Germany .

Primary Examiner—Robert J. Spar
Assistant Examiner—Fred A. Silverberg
Attorney, Agent, or Firm—Fleit & Jacobson

[57] ABSTRACT

Disclosed herein is a head for mixing and ejecting interacting liquid components, in particular for molding articles made of plastic material. The head comprises: a mixing chamber that communicates with a discharge duct, and a first and at least a second duct for infeeding the individual components, the orifices of which open into the mixing chamber; the latter being placed laterally with respect to the discharge duct and its axis forming an angle with the axis of the discharge duct.

9 Claims, 3 Drawing Figures

HEAD FOR MIXING AND EJECTING INTERACTING LIQUID COMPONENTS, FOR MOLDING PLASTIC MATERIALS

This is a continuation of application Ser. No. 961,853 filed Nov. 17, 1978, now abandoned.

BACKGROUND OF THE INVENTION

This invention relates to a head for mixing and ejecting liquid components which interact with one another, on the basis of a predetermined ratio, for molding articles made of plastic material.

DESCRIPTION OF THE PRIOR ART

In general, heads for molding articles made of plastic material are known, wherein the individual components to be mixed are injected directly into a mixing area defined by the discharge duct that communicates with the mold. The liquid substances to be mixed are, in fact, injected thru orifices that open directly and perpendicularly into the aforementioned discharge duct. This particular way of arranging the component mixing area with respect to the discharge duct is often the cause of quite serious trouble; in fact, the kinetic energy of the jets of the individual liquid components, instead of terminating within the space reserved for mixing, extends along the discharge duct with the result that a flow of not thoroughly mixed material overflows therefrom, frequently at a speed faster than that required.

Not only does this bring about the formation of imperfections in the parts molded, which have to be consequently rejected causing a serious financial loss, but with molds of the open type it can also cause the material to overspill out of the molds.

To unlimitedly increase the length of the discharge duct in such a way that the whirling flow created by the individual jets of the components ends before the exit from the head, thereby producing a regular flow of the mixed material, does not solve the problem; indeed, it worsens that pertaining to the transient phenomena that occur during the changeover between a normal component recycling phase, prior to each molding operation, and the subsequent phase of injecting or pouring into the mold the components that have interacted with one another. In fact, in heads of a known type the orifices for injecting the individual components into the mixing area of the discharge duct are closed and opened by a member that normally attends to the cleaning of the duct after each molding operation. Since, however, the discharge duct, and thus also the member entrusted with the cleaning operation, would be of a length that is excessively long, this would result in the inertia and the long travel of the piston of the operating cylinder of the cleaning member not permitting operation at high speed. On the other hand, the initial mixing seconds, that is to say, during the transient phenomena, are of great importance since it is precisely then that the mixing ratio of the liquid components needs most to be checked and maintained constant, and this is something that can only be guaranteed when the exit orifices open quickly.

SUMMARY OF THE INVENTION

The object of the present invention is, therefore, to make available a head of the aforementioned kind in which the mixing takes place in a chamber formed separately from the discharge duct, so as to prevent problems due to the imperfect mixing of the components arising, thus eliminating the propagation of residual whirling currents in the flow of material that travels along the discharge duct; with this it is also possible to reduce the length of the said discharge duct and thus also the overall dimensions of the head.

A further object of the present invention is to make available a mixing head of the aforementioned kind, in which the opening and closing, respectively, of the inlet orifices of the individual components into the mixing chamber can take place with extreme rapidity so as to reduce the duration of the transient phenomena in the changeover between a component recycling phase, prior to each molding operation, and the molding phase itself.

In general, the problem has been solved thru a head for mixing and ejecting liquid components that interact with one another, for molding articles made of plastic material, essential features of the said head being that it comprises in combination: a body defining a mixing chamber for the components which communicates with a discharge duct, and at least a first and a second infeed duct for the individual components, each provided with an orifice opening into the said mixing chamber, the latter being placed laterally with respect to the discharge duct and forming an angle with the axis thereof. The lateral inclined way in which the mixing chamber is arranged with respect to the discharge duct acts in such a way that the flow of material overflowing out of the mixing chamber knocks against the opposite wall of the said discharge duct, dampening to a great extent, or totally, the residual kinetic energy and thus producing a perfect mix and reaction between the two components. In this way it is possible to limit to a minimum the length of the discharge duct since a regular flow is obtained, and consequently the overall dimensions and the weight of the said head can be reduced.

Since, generally speaking, the length of the mixing chamber is very limited compared with that of the discharge duct, that way in which the mixing chamber is arranged separately makes it possible to use recycling valves for the individual components, which require lesser travel or shorter times of operation, and this reduces the duration of transient phenomena to a minimum. The foregoing can be achieved, for example, with the use of a slide valve in which the plunger can slide longitudinally within the said mixing chamber in order to allow or intercept, respectively, the flow of material towards the discharge duct, causing in the latter instance, the individual components to be recycled and maintaining at the same time, the said mixing chamber clean.

BRIEF DESCRIPTION OF THE DRAWINGS

These and other characteristics of the mixing head according to the present invention will be described hereinafter with reference to the accompanying drawings in which.

DESCRIPTION OF THE PREFERRED EMBODIMENT

With reference to the figures, the mixing and molding head comprises a body 1 in which is formed a mixing chamber 2 placed laterally and separated from a discharge duct 3 with which it communicates via an exit port 2' in the lateral wall of the said duct.

As can be seen from the figures listed above, the discharge duct 3 is arranged on a vertical axis, while the mixing chamber 2 is arranged on a horizontal axis or, in general, the axis of the mixing chamber 2 can form any angle with that of the said discharge duct 3, though preferably an angle of 90°.

Figure 1:
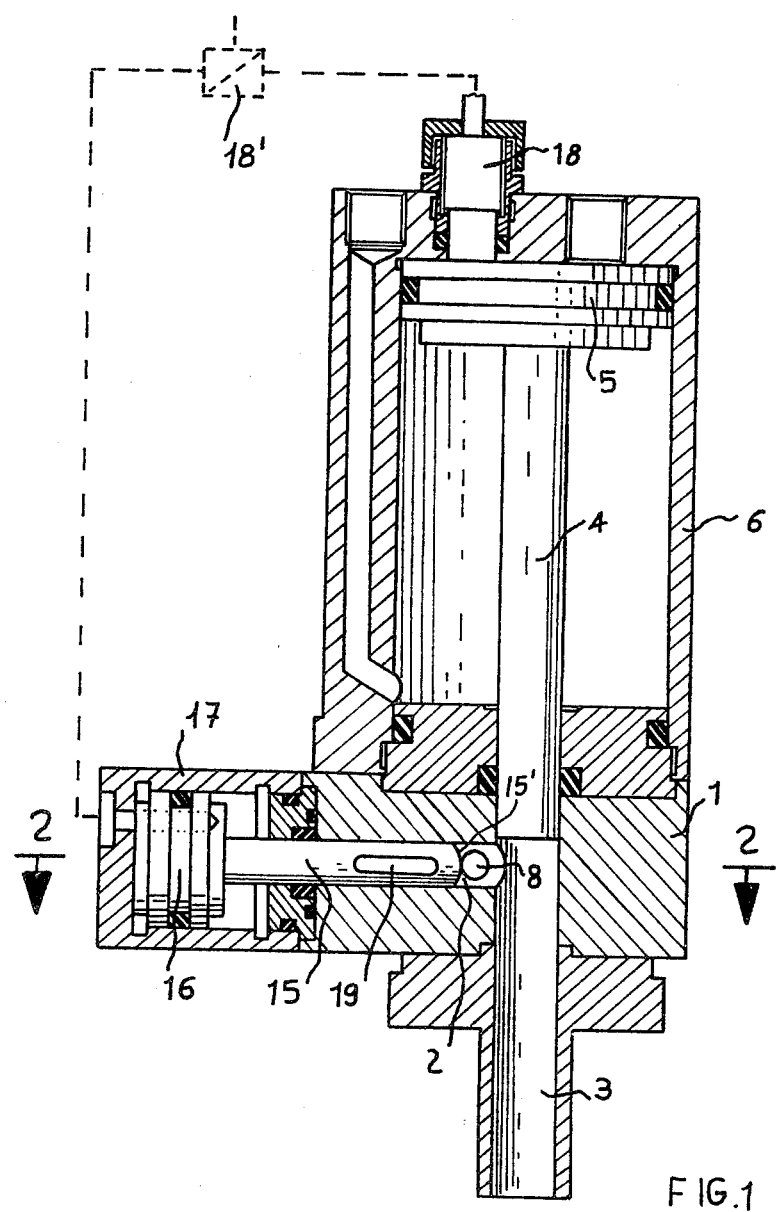
FIG. 1 is a longitudinal section, on a vertical plane, of the mixing head forming the subject of the present invention.

In the inside of the discharge duct 3 slides a cleaning member 4 constituted by a cylindrical extension to the plunger 5 of a double acting type operating cylinder 6, fixed to the body 1 of the head. The said cleaning member adopts a position in the rear part of the duct 3, as shown in FIG. 1, when the plunger is raised during the molding phase, and a forward position, at the time the said plunger 5 is lowered during a component recycling phase.

Figure 2:
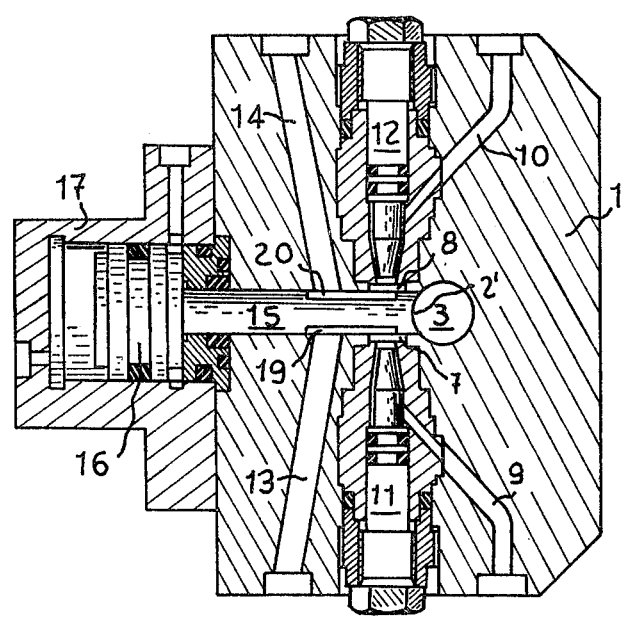
FIG. 2 is a cross section, made along the line 2—2 in FIG. 1, with the various parts set for the component recycling phase.
Figure 3:
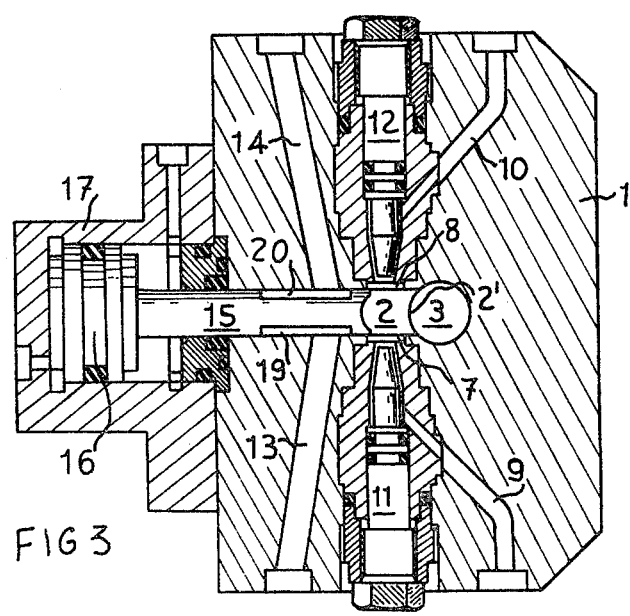
FIG. 3 is a section similar to that depicted in FIG. 2 but with the parts set for the component mixing and molding phase.

As illustrated more clearly in the views in FIGS. 2 and 3, the orifices 7 and 8, respectively, of two component infeed ducts marked 9 and 10, respectively, open in diametrically opposed positions into the mixing chamber 2. The said two component infeed ducts each have connected to them a needle valve, 11 and 12, respectively, for regulating the pressure at which the components are injected into the mixing chamber.

The head also comprises two ducts, 13 and 14, respectively, for recycling the components and these lead into a rear extension in the mixing chamber wherein slides the piston 15 of a slide valve which in its entirety constitutes a double recycling valve for both components. The piston 15 of the recycling valve is connected to the plunger 16 of an operating cylinder 17, the travel and dimensions of which are kept extremely limited since the distance between the orifices 7 and 8 of the component infeed ducts and the inlet to the component recycling ducts 13 and 14 is small; the cylinder 17 can, therefore, be made to operate in an extremely fast way. Furthermore, the operation of the cylinder 17 can be interlocked with the operation of the cylinder 6 that controls the member 4 for cleaning the discharge duct by using, for example, a proximity switch 18, or some other equivalent device, that is actuated upon completion of the raising movement of the plunger 5 of the cylinder of the cleaning member, in order to control the infeeding and the halting of the supply of the fluid to the operating cylinder 17 of the aforementioned recycling valve.

In the example illustrated, the use is envisaged of a recycling valve of the slide type, comprising a piston 15 formed with two opposite longitudinal slots 19 and 20, respectively, the length of which is substantially identical to the distance between the orifice of one infeed duct and the inlet to the corresponding component recycling duct. The piston 15 of the recycling valve ends in an enlarged extremely 15' which, during the recycling phase depicted in FIG. 2, closes the outlet of the mixing chamber going towards the discharge duct 3, thereby permitting the recycle of the components from the infeed ducts 9 and 10 to the recycling ducts 13 and 14, respectively. Alternatively, during the molding or injecting phase illustrated in FIG. 3, the extremity 15' of the piston 15 prevents the components from passing towards the said recycling ducts 13 and 14. It is, however, obvious that to replace the slide valve common to the recycling ducts for both components, a valve of any other type could be employed, including the use of separate recycling valves for each duct.

A brief description will now be given of the operation of the head according to the invention.

It should be assumed that initially the head is in the condition shown in FIG. 2, in which the piston 15 of the recycling valve stops the components from moving towards the discharge duct 3 but allows them to pass, as depicted, towards the recycling ducts 13 and 14. Obviously under such conditions the discharge duct cleaning member 4 will have been lowered thru the operation of the cylinder 6.

The components are made to recycle separately at the required pressure valve, for the period of time needed to suit the thermostatic heat requirements of the head itself. When a molding phase has to be effected, the cylinder 6 is actuated initially in order to cause the cleaning member 4 to move backwards, as shown in FIG. 1, to free the communication of the mixing chamber 2 with the discharge duct 3. Once the plunger 5 of the cylinder 6 has reached its upper position, the proximity switch 18 feels the plunger 5 and actuates an electrovalve 18' and this feeds the fluid to the cylinder 17 of the recycling valve which displaces the piston 15 into the position shown in FIG. 3. Since the changeover from the condition depicted in FIG. 2 to that illustrated in FIG. 3 takes place with short travel on the part of the recycling valve, the latter can be operated extremely quickly, thus reducing to a minimum the duration of transient phenomena between one phase and another. The liquid components are, therefore, injected into the mixing chamber 2 where they mix and overflow penetrating laterally into the discharge duct 3. Because of the different arrangement of the axes of the mixing chamber and of the discharge duct 3, the swirl that remains in the flow of the mixed material ceases in a small amount of space due to the flow being made to deviate and to its knocking against the opposite wall of the discharge duct. In consequence, immediately after the outlet from the mixing chamber, the flow in the said discharge duct will consist of homogeneous perfectly mixed material that overflows out of the duct 3 at the required speed.

When the molding operation is over, the recycling valve is again operated to cause the piston 15 to move forward and intercept the flow of the components towards the discharge duct 3 and to deviate it towards the recycling ducts 13 and 14; contemporaneously, the front extremity of the piston 15 cleans the mixing chamber. Subsequently the cylinder 6 is actuated and this again causes the cleaning member 4 of the discharge duct 3 to move forward again, and everything remains in the said condition until the forthcoming molding cycle.

It will be appreciated that the lateral disposition of mixing chamber 2 makes it possible to use a mixing chamber 2 and a discharge duct 3 having different diameters or cross sections. Thus, as illustrated in the drawings, the diameter of mixing chamber 2 is less than the diameter of discharge duct 3. This improves the mixing efficiency of the interacting components inside the chamber.

What is claimed is:

1. A head for continuously mixing and ejecting interacting liquid components into a mold for molding articles made of plastic material, comprising in combination: a body defining a mixing chamber for the components; a discharge duct having an outlet; at least a first and a second infeed duct for injecting individual components into said mixing chamber for a predetermined time period; exit port means for establishing fluid communication between said infeed ducts and said discharge duct, said infeed ducts being provided with outlet orifices that open into said mixing chamber close to said exit port means; and piston means for controlling fluid communication between said infeed ducts and said discharge duct outlet so that fluid communication is established therebetween during substantially the entire predetermined time period when said infeed ducts are injecting components into said mixing chamber so that injected components flow continuously out of said mixing chamber through said discharge duct and are thoroughly mixed during their passage through said discharge duct, said mixing chamber forming an angle of substantially 90° with said discharge duct and having a length shorter than and a volume less than that of said discharge duct so that components injected into said mixing chamber mix with each other and overflow into said discharge duct in a swirling flow.

2. A head according to claim 1, in which said mixing chamber and said discharge duct are axially extending, and in which said mixing chamber, in a plane perpendicular to its axis, has a cross-sectional area different from a corresponding cross sectional area of said discharge duct.

3. A head according to claim 1, comprising at least a first and a second duct for recycling the individual components, the infeed ducts being positioned between said recycling ducts and said discharge duct, and said piston means comprising a recycling valve of the slide type having piston means able to slide in said mixing chamber, said piston means being movable between a first position in which fluid communication between said mixing chamber and said discharge duct is blocked and respective ones of said infeed and discharge ducts are in fluid communication with each other, and a second position in which said mixing chamber and discharge duct are in fluid communication and fluid communication is blocked between said infeed and recycling ducts.

4. A head according to claim 3, further comprising a cleaning member mounted for axial movement in said discharge duct, said cleaning member being movable into a recessed position in which the exit port of said mixing chamber to said discharge duct is positioned between said cleaning member and an outlet of said discharge duct; and a switch-controlled cylinder for operating said recycling valve, said switch being actuated by movement of said cleaning member into said recessed position.

5. A head according to claim 1, further comprising a cleaning member mounted for axial movement in said discharge duct, said cleaning member being movable into a recessed position in which the exit port of said mixing chamber to said discharge duct is positioned between said cleaning member and an outlet of said discharge duct so that components flow continuously from said infeed ducts into said mixing chamber, flow through said mixing chamber into said discharge duct, and are ejected from the outlet of said discharge duct.

6. A head for continuously mixing and ejecting predetermined variable amounts of fluid materials, comprising a body defining a mixing chamber; a discharge duct having at one end an outlet portion for ejecting a mixture, said discharge duct having an inlet communicating with said mixing chamber and having an axis extending transverse to an axis of said mixing chamber; a cleaning member able to slide in the discharge duct between recessed and extended positions, in said recessed position said duct inlet being in fluid communication with said duct outlet portion and in said extended position said cleaning member blocking fluid communication between said duct inlet and said duct outlet portion; a first double acting cylinder for moving said cleaning member between said recessed and said extended positions; a first and a second duct opening into said mixing chamber for infeeding individual components, said infeeding ducts being positioned in close proximity to said duct inlet so that mixing action initiated in said mixing chamber continues in said discharge duct; a first and a second duct for recycling the individual components from said mixing chamber; and a slide valve movable between a first position in which selected ones of said infeed and recycling ducts are in fluid communication with each other and fluid communication is blocked between said infeeding ducts and said duct inlet, and a second position in which said infeeding ducts are in fluid communication with said duct inlet and fluid communication is blocked between said infeeding and said recycling ducts; a second double acting cylinder for controlling movement of said slide valve between said first and said second positions; and operating link-up means between said double acting cylinders for moving said slide valve from said first to said second position after said cleaning member has been moved from said extended position towards said recessed position so that said infeeding ducts, mixing chamber, and discharge duct are in fluid communication with each other during substantially the entire period during which individual components are fed into said mixing chamber so that the components overflow from said mixing chamber into said discharge duct, said operating link-up means comprising a switch operatively associated with said first double acting cylinder, an electrovalve actuated by said switch, a supply circuit of said second double acting cylinder being connected to said electrovalve.

7. A head according to claim 6, wherein the axis of said mixing chamber is perpendicular to the axis of said discharge duct.

8. A head according to claim 6, wherein the cross-sectional area and volume of said mixing chamber are less than the cross-sectional area and volume of said discharge duct.

9. A head according to claim 1 or 6, wherein the length of mixing chamber is very limited compared with the length of the discharge duct.

* * * * *